(12) United States Patent
Basaki

(10) Patent No.: US 7,672,193 B2
(45) Date of Patent: Mar. 2, 2010

(54) METHODS AND SYSTEMS FOR PROCESSING ACOUSTIC WAVEFORM DATA

(75) Inventor: Satoshi Basaki, Tokyo (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/116,934

(22) Filed: May 7, 2008

(65) Prior Publication Data

US 2008/0291780 A1 Nov. 27, 2008

Related U.S. Application Data

(60) Provisional application No. 60/939,222, filed on May 21, 2007.

(51) Int. Cl.
*G01V 1/00* (2006.01)
(52) U.S. Cl. .......................... 367/31; 367/25
(58) Field of Classification Search ............. 367/25, 367/31–33, 68–69
See application file for complete search history.

(56) References Cited

U.S. PATENT DOCUMENTS

| 4,575,828 | A | * | 3/1986 | Williams .................. 367/31 |
| 6,023,443 | A | | 2/2000 | Dubinsky et al. |
| 6,088,294 | A | | 7/2000 | Leggett, III et al. |
| 6,427,124 | B1 | | 7/2002 | Dubinsky et al. |
| 6,459,993 | B1 | | 10/2002 | Valero et al. |
| 6,581,010 | B2 | | 6/2003 | Dubinsky et al. |
| 6,661,737 | B2 | * | 12/2003 | Wisniewski et al. .......... 367/25 |
| 6,839,633 | B1 | | 1/2005 | Basaki et al. |
| 6,956,790 | B2 | | 10/2005 | Haldorsen |
| 7,492,664 | B2 | * | 2/2009 | Tang et al. .................. 367/31 |
| 2003/0014190 | A1 | * | 1/2003 | Dubinsky et al. ............. 702/7 |
| 2004/0223412 | A1 | | 11/2004 | Haldorsen |
| 2004/0254733 | A1 | | 12/2004 | Basaki et al. |
| 2007/0064529 | A1 | * | 3/2007 | Robinson .................. 367/31 |
| 2007/0097788 | A1 | | 5/2007 | Tang et al. |
| 2008/0175099 | A1 | * | 7/2008 | Hawthorn et al. ............. 367/25 |

OTHER PUBLICATIONS

Kimball, "Semblance processing of borehole acoustic array data", Geophysics, vol. 49, No. 3, Mar. 1984.*
C.V. Kimball, T.L. Marzetta, "Semblance processing of borehole acoustics array data", Geophysics, vol. 49, No. 3, pp. 274-281.

* cited by examiner

*Primary Examiner*—Scott A Hughes
*Assistant Examiner*—Krystine Saito
(74) *Attorney, Agent, or Firm*—Matthias Abrell; Jaime Castano; Dale Gaudier

(57) ABSTRACT

Methods and systems for taking acoustic measurements related to subterranean formations. The methods and systems provide extracting a portion of the acoustic measurements based on predetermined parameters for selecting reflected arrival waves in the acoustic measurements; generating time projection of the extracted acoustic measurements versus borehole depth; and generating an indication or imaging of acoustic reflectors in the formation based on the time projected acoustic measurements.

15 Claims, 7 Drawing Sheets

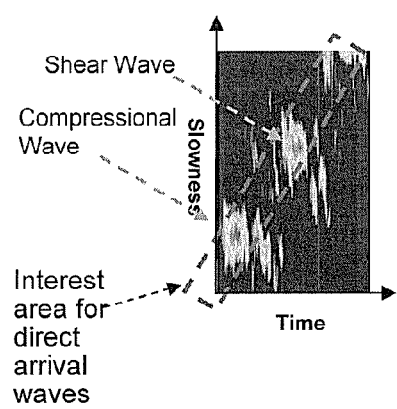 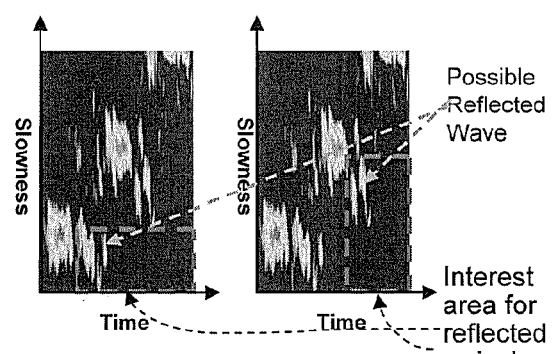
Figure 3A     Figure 3B     Figure 3C

Min. Slowness = 0

Extracted Reflected Arrival Waves

US 7,672,193 B2

METHODS AND SYSTEMS FOR PROCESSING ACOUSTIC WAVEFORM DATA

RELATED APPLICATIONS

This application claims priority of U.S. Provisional Patent Application Ser. No. 60/939,222, filed 21 May 2007, the entire contents of which are incorporated herein by reference.

FIELD

The present invention relates generally to methods and systems for investigating subsurface formations using acoustic measurements made in a borehole. More particularly, the present disclosure is directed to methods and systems that provide efficient, real-time processing of acoustic data for purposes of indicating or imaging possible acoustic reflectors in subsurface formations.

BACKGROUND

Acoustic measurements using currently available tools and methods provide key information in oilfield borehole logging. The currently available acoustic tools are useful in providing a wide range of information regarding the surrounding formation and the borehole parameters. Surface seismic and vertical seismic profiling (VSP) methods are utilized to provide imaging of the overall geological structure of a hydrocarbon reservoir. Sonic and other well logging methods provide good resolution imaging in the immediate vicinity of the borehole. Sonic imaging is yet another technique that bridges the gap in spatial resolution between these seismic and well logging methods.

Some tools include a single source of sonic waves and two or more receivers, however, most of the tools now include two or more acoustic sources and many receivers arranged in an array. A primary use of acoustic borehole measurements is the estimation of compressional (P) wave and/or shear (S) wave formation slowness. The estimation of compressional and/or shear wave formation slowness is often expressed as an ST (slowness vs. time) plane, and can be visualized at the wellsite with current technology.

The assignee of the present application, Schlumberger, has developed a wireline sonic imaging tool (referred to as the Borehole Acoustic Reflection Survey (BARS) tool) that allows reservoir features such as reflectors and fractures to be imaged.

While sonic imaging generally has been successful, waveform data acquired for sonic imaging purposes typically contain many types of arrivals in addition to the desired reflected arrivals, such as tool-borne noise and borehole-borne noise. For example, direct compressional and shear headwaves and tube waves, which are a part of the raw data that are acquired during downhole acoustic measurements, tend to obscure the reflected arrival waves relating to acoustic reflectors in subterranean formations. As a consequence, often it is not evident at a wellsite whether or not the acquired acoustic measurements include the desired reflected arrival data relating to subterranean acoustic reflectors. Techniques that effectively identify or eliminate this noise are desirable in the acquisition and processing of sonic imaging data. Moreover, techniques that are capable of indicating possible acoustic reflectors in subsurface formations on the fly for real-time, wellsite decision-making are clearly desirable.

The present invention is directed to overcoming, or at least reducing the effects of, one or more of the problems outlined above. Accordingly, an object of the present disclosure is to provide improved systems and methods for processing acoustic waveform data acquired in a borehole in which reflected arrival waves are easily identified and selected from tool-borne and borehole-borne arrivals. A further object of certain embodiments herein is to provide improved systems and methods that use real-time indicators or imaging of possible acoustic reflectors in subsurface formations for adjusting data acquisition parameters at, for example, the wellsite. A further object of certain embodiments herein is to provide indicators or imaging of possible acoustic reflectors in subsurface formations for enhanced data processing at, for example, a data center by reducing the overall time that is required for processing acoustic waveform data.

SUMMARY

The present invention meets the above-described needs and others. Specifically, the present disclosure provides methods and systems for taking measurements relating to subterranean formations, and, in particular, for logging subterranean formations. The methods and systems provide processing of acoustic waveform data relating to a subterranean formation, comprising taking acoustic measurements at one or more depths of a borehole traversing a subterranean formation; extracting a portion of the acoustic measurements based on predetermined parameters for selecting reflected arrival waves in the acoustic measurements; generating time projection of the extracted acoustic measurements versus borehole depth; and generating an indication or imaging of acoustic reflectors in the formation based on the time projected acoustic measurements.

In some embodiments disclosed herein, the predetermined parameters for selecting reflected arrival waves are arrival time and formation slowness. The predetermined parameters for selecting reflected arrival waves may be selected from maximum arrival time=data acquisition time at a borehole depth; minimum arrival time=compressional and/or shear arrival time; maximum slowness=estimated or real-time compressional and/or shear slowness for the formation; and minimum slowness=0. In aspects herein, the indication or imaging of acoustic reflectors is generated for multiple depths of acoustic measurement. The measurements taken may be logging measurements. The measurements taken may be while-drilling measurements.

In aspects of the present disclosure, the measurements are waveforms and the extracting a portion of the acoustic measurements comprises stacking the waveforms in a slowness vs. time (ST) plane; generating a processing window around a portion of the stacked waveforms based on the predetermined parameters; and extracting the stacked waveforms in the processing window. In yet other aspects herein, the extracting a portion of the acoustic measurements comprises selecting a portion of the waveforms based on the predetermined parameters; stacking the selected portion of the waveforms in a slowness vs. time (ST) plane; and extracting the stacked waveforms.

According to the techniques disclosed herein, an indication or imaging of acoustic reflectors in the formation may be generated in real-time with the acoustic measurements.

According to one method disclosed herein logging a subterranean formation comprises generating acoustic waves with a source; receiving acoustic waveforms with a plurality of receivers; extracting a portion of the acoustic waveforms based on predetermined parameters for selecting reflected arrival waves from the acoustic waveforms; generating time projection of the extracted acoustic waveforms versus borehole depth; and providing an indication or imaging of acoustic reflectors in the formation based on the time projected acoustic waveforms for multiple depths of data acquisition, wherein the predetermined parameters for selecting reflected arrival waves are arrival time and formation slowness. In aspects herein, a logging method further comprises providing at a wellsite, in real-time with receiving acoustic waveforms, the indication or imaging of acoustic reflectors in the formation; and utilizing the indication or imaging of acoustic reflectors for adjusting parameters of the subterranean logging. In other aspects herein, a logging method further comprises utilizing the indication or imaging of acoustic reflectors in the formation for adjusting data processing parameters of the acoustic waveforms.

In some embodiments disclosed herein, one method of acquiring acoustic measurements relating to a subsurface formation comprises generating acoustic waves with a source; receiving acoustic waveforms with a plurality of receivers; in real-time with receiving the acoustic waveforms extracting a portion of the acoustic waveforms based on predetermined parameters for selecting reflected arrival waves from the acoustic waveforms, generating time projection of the extracted acoustic waveforms versus borehole depth, and generating an indication or imaging of acoustic reflectors in the formation based on the time projected acoustic waveforms for multiple depths of data acquisition; and adjusting parameters relating to the acoustic measurements based on the indication or imaging of acoustic reflectors in the formation.

A system for taking acoustic measurements relating to a subterranean formation comprises an acoustic tool comprising at least one source and a plurality of receivers mounted thereon; a computer in communication with the acoustic tool; a set of instructions executable by the computer that, when executed, extract a portion of the acoustic measurements based on predetermined parameters for selecting reflected arrival waves from the acoustic measurements; generate time projection of the extracted acoustic measurements versus borehole depth; and provide an indication or imaging of acoustic reflectors in the formation based on the time projected acoustic measurements.

Additional advantages and novel features will be set forth in the description which follows or may be learned by those skilled in the art through reading these materials or practicing the invention. The advantages may be achieved through the means recited in the attached claims.

BRIEF DESCRIPTION OF THE DRAWINGS

The accompanying drawings illustrate preferred embodiments and are a part of the specification. Together with the following description, the drawings demonstrate and explain the principles of the present invention.

FIGS. 3A-3C display areas selected in a slowness vs. time (ST) plane that are identified as having direct arrivals and reflected arrivals for synthetic sonic logging data.

Throughout the drawings, identical reference numbers designate similar, but not necessarily identical, elements.

DETAILED DESCRIPTION

Figure 1A:
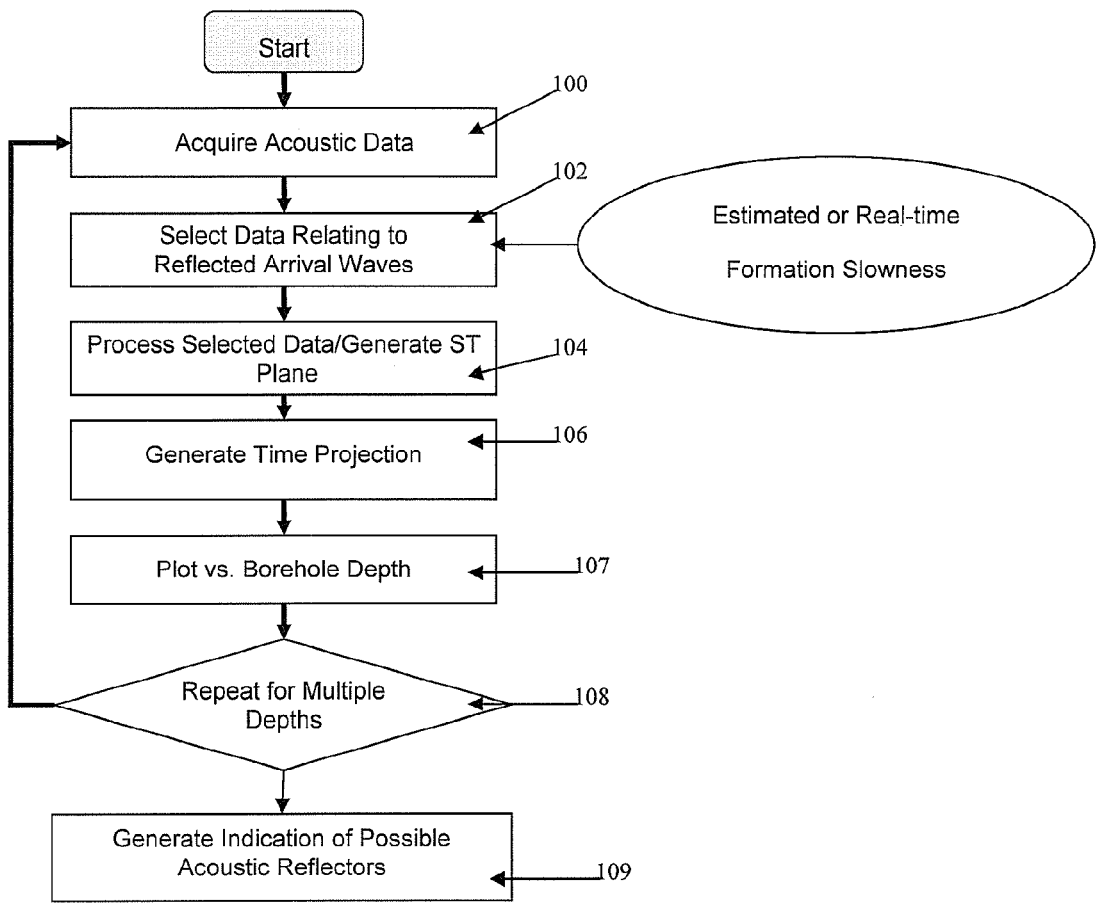
FIGS. 1A and 1B are flowcharts illustrating acoustic data processing techniques according to the description herein.

Illustrative embodiments and aspects of the invention are described below. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such a development effort might be complex and time-consuming, but would nevertheless be a routine undertaking for those of ordinary skill in the art having the benefit of this disclosure.

The words "including" and "having," as used in the specification, including the claims, have the same meaning as the word "comprising." The word "acoustic" includes both frequencies of conventional sonic tools, as well as those used in seismic tools and applications.

The present disclosure contemplates real-time indication or imaging of acoustic reflectors in subsurface formations. As mentioned above, in the past acoustic reflectors in subsurface formations could only be accurately identified by processing large amount of data, including noise, that are acquired during a logging operation. Prior to the principles described herein, an accurate, real-time indication of subsurface reflectors could not be done by selectively processing only the waveform data having the reflected arrivals.

The present disclosure provides methods and systems for logging a subterranean formation by providing indicators or imaging of acoustic reflectors in the formation. In this, the techniques proposed herein do not require locations or orientations of subsurface reflectors; rather, the techniques provide a wellsite capability to assess on the fly the quality or nature of the acoustic measurements that are acquired during borehole logging. In addition or alternatively, parameters relating to the data processing of acquired acoustic measurements may be adjusted or selected based on the indication or imaging of acoustic reflectors in the formation.

The methods and systems may be applied to acoustic wellbore logging with a wireline sonic logging tool. However, the methods and systems presented herein are not so limited. For example, the methods and systems may be applied to other applications such as logging while drilling (LWD), measurement while drilling (MWD), production logging. The present disclosure contemplates the use of the methods and systems herein in combination with various acoustic measurements, for example, with other seismic logging operations.

The techniques disclosed herein provide acoustic reflector indicators for enhanced oilfield borehole logging. For example, the techniques may be utilized for purposes of adjusting data acquisition parameters at a wellsite. In this, an indication of possible acoustic reflectors provides a wellsite engineer with the ability to adjust acoustic data acquisition parameters based on the possible locations of acoustic reflectors in subsurface formations.

The techniques disclosed herein provide acoustic reflector indicators for enhanced processing of oilfield borehole logging data. For example, the techniques may be utilized for purposes of adjusting data processing parameters at a computer center. In this, an indication of possible acoustic reflectors provides the capability for a data processing technician to reduce data processing time by focusing on the specific data interval that should be processed. For example, if logging data has been acquired over a couple of thousand feet of depth, but the techniques disclosed herein indicate that the acquired data has only a couple of hundred feet of possible reflected waveform data, the computer center can run the data processing on just the area having the possible reflected waveform data and eliminate unnecessary processing of data that do not have the desired waveforms.

The proposed techniques include processing acquired acoustic waveforms in slowness vs. time (ST) plane domain using predetermined processing windows that identify reflected arrival waves, creating a time projection from stacked waveforms of the ST plane domain, and plotting the time projection on a depth axis for each borehole depth of interest. The processing may be repeated for every depth of data acquisition to obtain real-time indicators of possible locations of acoustic reflectors in the surrounding subsurface formations.

Figure 1B:
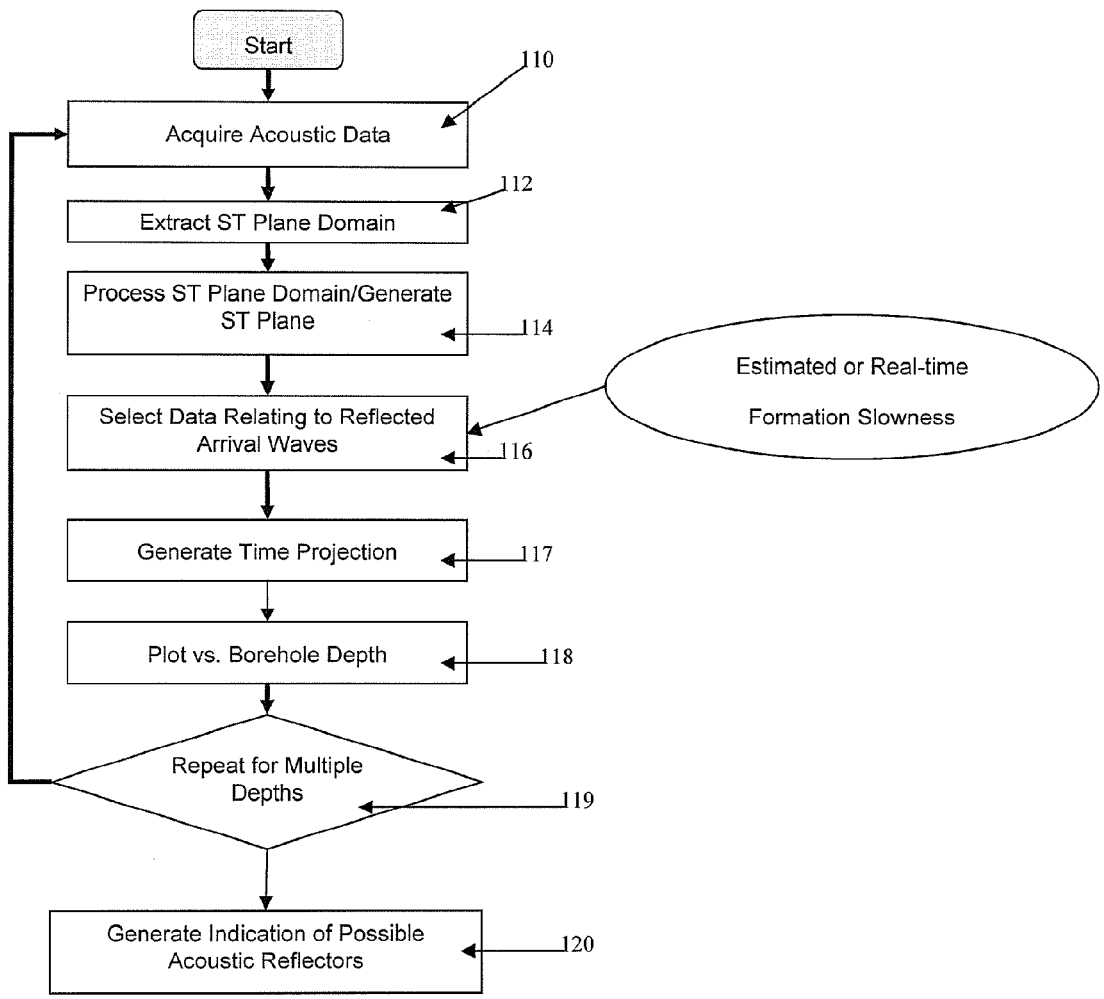

FIGS. 1A and 1B are flowcharts illustrating some processing techniques according to the description herein. In the embodiment of FIG. 1A, acquired acoustic data in ST plane domain relating to reflected arrivals are selected before stacking in a slowness vs. time (ST) plane. In the embodiment of FIG. 1B, all acquired data in ST plane domain are processed, and the stacked reflected arrival waves in the ST plane are identified and extracted for further processing.

Referring to FIGS. 1A and 1B, waveform data are acquired at each depth 100/110. In the processing workflow of FIG. 1A, using estimated formation slowness or real-time formation slowness, data relating to reflected arrival waves is selected 102. In this, a processing window selects or extracts acoustic waveform data that are relevant to the processing of reflected arrival waves, and eliminates other waveforms, such as direct arrival waves, that are less relevant for the purposes described herein. Techniques for generating processing windows are described in more detail below.

Formation slowness values may be obtained using separately acquired data, or may be estimated using known techniques. For example, slowness-time coherence (STC) processing techniques that are known in the art may be utilized for determining formation slowness. Borehole compensated (BHC) processing techniques also may be utilized. Estimated formation slowness may be obtained using, for example, drilling data that typically includes rough slowness data.

The selected waveform data in the processing window (Step 102 of FIG. 1A) is stacked in the ST plane 104 using processing techniques that are known to those of ordinary skill in the art. Note FIG. 1A.

In the processing workflow of FIG. 1B, the acquired acoustic data in ST plane domain 112 is stacked in an ST plane 114 before selecting data relating to reflected arrivals 116 using estimated formation slowness or real-time formation slowness.

Referring to FIGS. 1A and 1B, the selected reflected arrival waves that are stacked in the ST plane (Step 104/116) are projected onto the time axis by collapsing the slowness axis 106/117. The time projection of the ST data may be achieved using a variety of mathematical techniques that are known to one having ordinary skill in the art. The results of the time projection (Step 106/117) are plotted along the borehole depth axis 107/118. The above steps may be repeated for each depth of data acquisition 108/119, as desirable or necessary. The results of the above data processing may be utilized to generate indications of possible acoustic reflectors in subsurface formations 109/120. Note also FIG. 6C.

As described in further detail below, the techniques illustrated in the flowcharts of FIGS. 1A and 1B provide efficient, real-time indicators of possible acoustic reflectors in subsurface formations. In this, as described below, the acquired data may be stacked in a ST plane before or after selecting the data relating to reflected arrival waves.

Figure 6A:
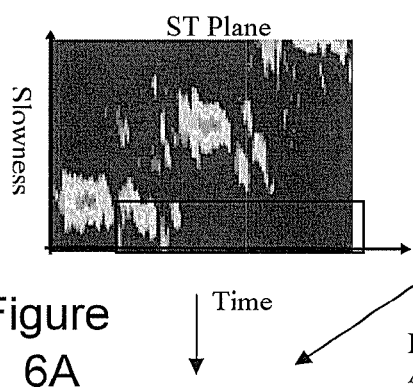
FIGS. 6A-6C illustrate one exemplary technique for time projection of selected waveform data versus borehole depth according to the disclosure herein.
Figure 6B:
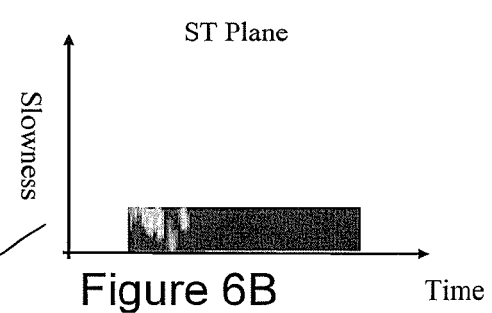
Figure 6C:
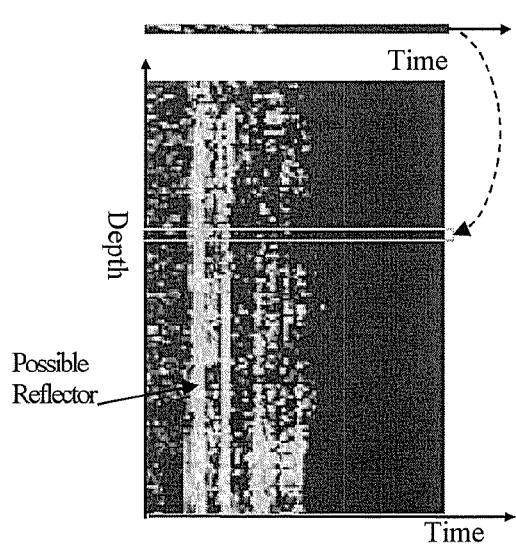

FIG. 6C shows one exemplary result of the processing of synthetic waveform data that are selected for reflected arrivals using the time projection techniques described herein. In this, a depiction such as FIG. 6C provides a wellsite engineer with real-time capability to set or modify data acquisition parameters based on the displayed indicators or imaging of possible acoustic reflectors in the subsurface formation. Such real-time imaging of acoustic reflectors is possible as a result of eliminating direct arrival waves by selecting areas of the ST plane that have reflected arrivals, as discussed in further detail hereinafter.

Furthermore, the processing steps described above provide indication of possible reflected waveform data in acquired acoustic measurements that may be used to reduce further data processing time at a computer center. The indications of possible reflected waveform data described herein may be utilized to focus on a specific data interval or intervals that should be processed further using more detailed processing techniques. For example, logging data may have been acquired over a couple of thousand feet of depth. The acquired data may have only a couple of hundred feet of the desired reflected waveform data. The processing of all the acquired data is time consuming and expensive. Therefore, using the techniques of the present disclosure, a data processing center can identify the data having possible reflected waveform data and run their detailed data processing on the selected data. The data processing need not be applied to all the data thereby saving time and data processing costs.

Figures 2A, 2B:
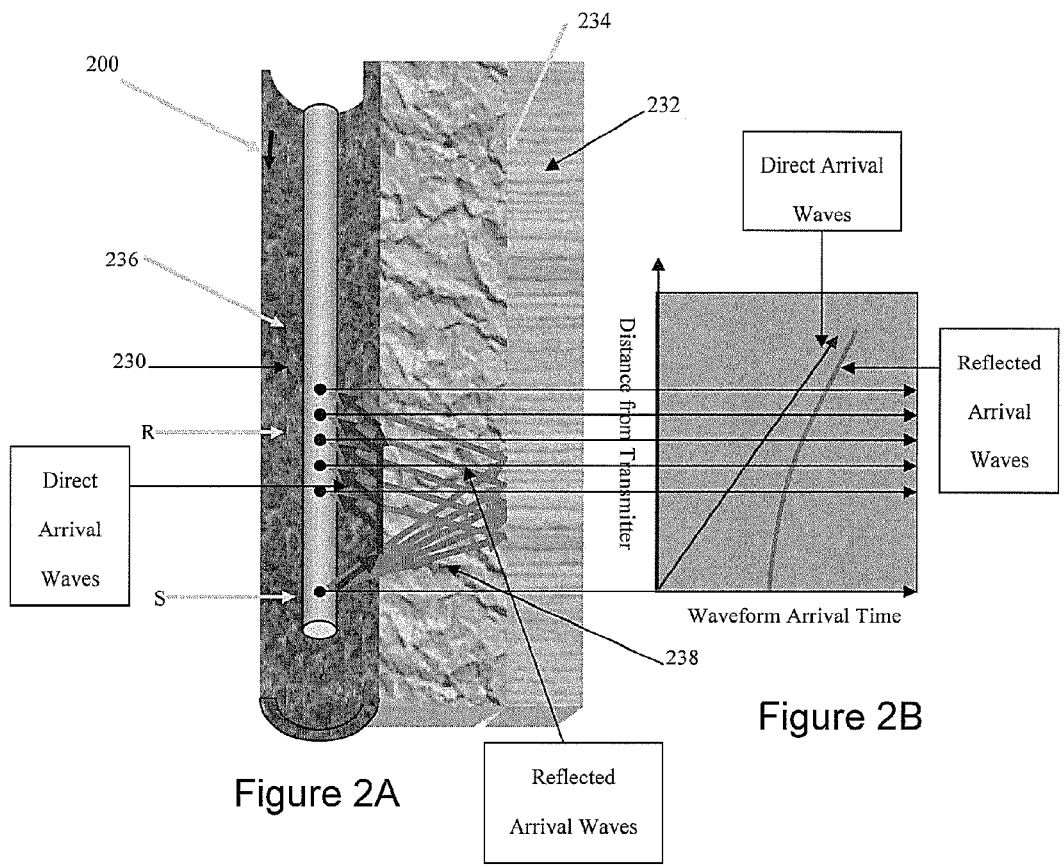
FIG. 2A depicts one possible tool configuration for practicing the techniques of the present disclosure.
FIG. 2B illustrates a conceptual relationship between distance of a reflector from a downhole tool and waveform arrival times.

FIG. 2A illustrates one possible tool configuration 230 for practicing the techniques of the present disclosure.

Referring to FIG. 2A, one exemplary configuration of a transmitter S and a receiver array R spaced from the transmitter S is provided to illustrate one possible arrangement for acquiring acoustic data in a borehole 200. As shown by the darker arrowhead lines of FIG. 2A, some acoustic waves 238 from the transmitter S propagate along borehole 200 and then arrive directly at the set of receivers R. Also, some acoustic waves 238 from the transmitter S propagate, as shown by the lighter arrowhead lines of FIG. 2A, to each receiver R after returning from a reflector 234 in a formation 232.

FIG. 2B illustrates a theoretical relationship between distance of a reflector from a downhole tool and waveform arrival times. In the graph of FIG. 2B, arrival times of two different acoustic waves, i.e., direct arrival waves and reflected arrival waves, are represented as a function of distance of the reflector 234 from the tool transmitter S. As evident from FIG. 2B, the arrival times for direct arrival waves change almost linearly in relation to the distance of the reflector 234 from the tool 230. On the other hand, the arrival times for the reflected arrival waves change along a hyperbolic curve in relation to the distance of the reflector 234 from the tool 230. In this, the travel lengths for the reflected arrivals are determined by the following Equation 1.

$$\text{path for reflected wave} = 2 * \sqrt{\left(\frac{\text{Distance between Transmmiter and Receiver}}{2}\right)^2 + (\text{Distance from Reflector})^2} \quad (1)$$

FIG. 2B also shows that the reflected arrival waves arrive at each receiver later than the direct arrival waves. In other words, reflected arrival waves have faster apparent slowness than direct arrival waves. A discussion relating to apparent slowness may be found in commonly-owned U.S. Pat. No. 6,839,633, Methods and Apparatus for Imaging a Subsurface Fracture, to Basaki et al.

As a consequence of the above understanding, the inventor herein recognized that direct and reflected arrival waves should appear in different and distinct areas of a slowness vs. time (ST) plane.

FIGS. 3A-3C illustrate the principles described above using synthetic sonic waveform data. Specifically, FIGS. 3A-3C depict areas selected in a slowness vs. time (ST) plane that are identified as having direct arrivals and reflected arrivals. In FIG. 3A, the selected area is of interest for direct arrivals. In contrast, FIGS. 3B and 3C show areas that are of interest for reflected arrivals. As evident from FIGS. 3A-3C, the direct arrival waves and the reflected arrival waves are situated at different and distinct areas of the ST plane.

The inventor herein further recognized that in order to process reflected arrival waves, it would be sufficient to process only acoustic waveforms within a selected area in the ST plane relating to reflected waves. The present inventor has proposed novel techniques for identifying the areas of interest for direct arrivals and reflected arrivals on a ST plane so that appropriate data may be processed, and data that are less relevant to the processing may not be processed. As a consequence of the principles described herein, efficient and enhanced processing of acoustic waveform data is possible so that real-time indicators or imaging of subsurface acoustic reflectors are available for wellsite applications.

Figure 4A:
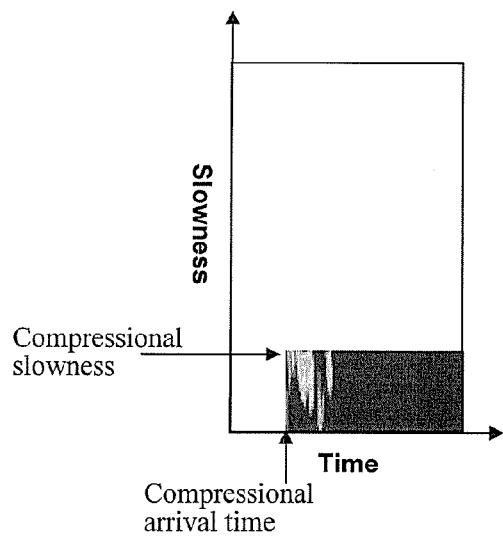
FIGS. 4A-4C depict exemplary areas in an ST plane having reflected arrival waves for processing according to the techniques described herein.
Figure 4B:
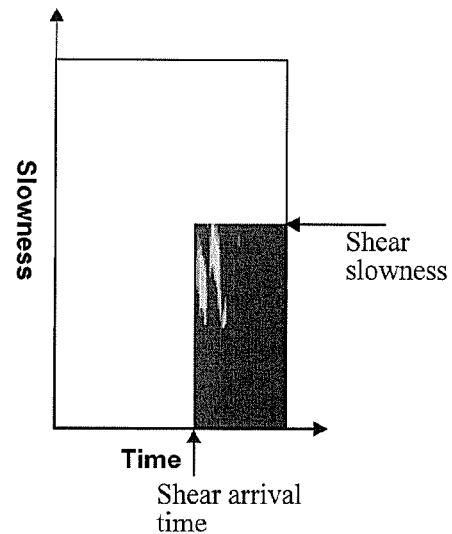
Figure 4C:
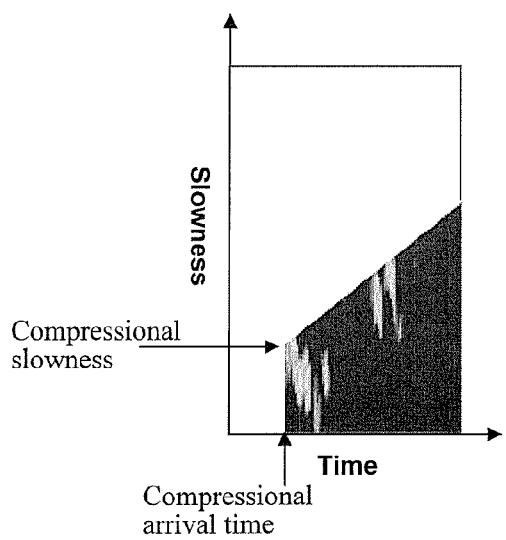

FIGS. 4A-4C illustrate exemplary areas in the ST plane that are selected for reflected arrival waves thereby eliminating direct arrival waves (note FIGS. 3A-3C). The processing of the reflected arrival waves by ST domain stacking is achieved according to the techniques described herein (note the flowcharts of FIGS. 1A and 1B).

FIGS. 4A-4C show some examples of areas that may be selected from a slowness vs. time (ST) domain for ST processing by using formation slowness (compressional and/or shear) values and the transmitter-to-receiver (TR) spacing for defining processing windows, as described in further detail below. Consequently, acquired waveform processing for reflected waves may be significantly reduced. In addition, it is possible to remove effects of direct waves, and identify indications of possible subsurface reflectors with ease.

Figure 5:
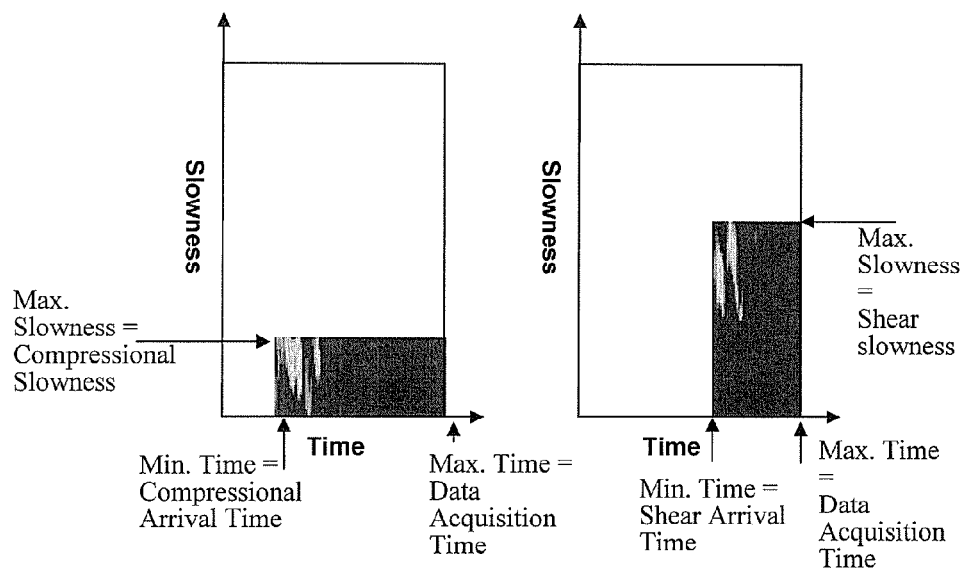
FIG. 5 illustrates one method described herein for selecting the areas depicted in FIGS. 4A-4C.

FIG. 5 depicts one possible technique for generating the processing areas or windows illustrated in FIGS. 4A-4C. As previously described in connection with FIGS. 1A and 1B above, two approaches may be utilized for processing the acquired waveform data according to the principles described herein. As depicted in FIG. 1A, waveform data only in a selected domain area may be processed. On the other hand, as depicted in FIG. 1B, all acquired waveform data may be processed, and data relating to the selected domain area may be extracted. Generally, the processing area or window described herein relates to a particular depth of a borehole.

Referring to FIG. 5, in one possible approach for selecting the processing window, the estimated or real-time value of compressional and/or shear slowness for the formation may be utilized as the maximum slowness value for the processing window. The minimum slowness value may be set as 0. The maximum time for waveform data acquisition at the subject borehole depth may be set as the maximum time value for the processing window. The minimum time value for the processing window may be set as the compressional and/or shear arrival time, which is determined by multiplying the compressional and/or shear slowness for the formation by TR spacing for the subject tool.

For example, for a tool having a TR spacing of 10 ft, a formation with a compressional slowness of 60 μs/ft, and a maximum data acquisition time of 5000 μs/ft, the processing area would be generated with a minimum slowness value of 0, a maximum slowness value of 60, a minimum time value of 600, and a maximum time value of 5000.

The methodology described in the preceding provides one possible approach for selecting maximum and minimum values for slowness and time functions of the processing windows. However, any suitable approach may be utilized that provides processing windows with the relevant waveform data for purposes of indicating subsurface acoustic reflectors.

FIGS. 6A-6C illustrate one exemplary technique for time projection of selected waveform data versus borehole depth.

FIG. 6A depicts synthetic waveform data that are represented on the ST plane. The entire slowness-time (ST) domain or slowness-time plane (STP), illustrated in FIG. 6A, may be used to select a processing area. FIG. 6B illustrates a selected domain area, i.e., a processing window that has been generated according to the techniques described above. If all the data of the ST plane of FIG. 6A is processed without selection (as described above in connection with FIG. 1B), it is necessary to remove areas in the ST plane that have unnecessary data, i.e., noise, for purposes of identifying or imaging possible acoustic reflectors in the formation.

The processing of the acquired waveform data, either all the acquired data or only selected data in processing windows, may be performed by stacking the waveforms received by receiver arrays. The processed results for the waveforms within the selected area or areas (FIG. 6B) are projected onto the time axis for each depth of data acquisition by collapsing the slowness axis (FIG. 6C). FIG. 6C depicts an exemplary indication or imaging of possible acoustic reflectors in a subsurface formation according to the processing techniques of the present disclosure.

The present inventor unexpectedly found that it is possible to derive indications or imaging of acoustic reflectors in the surrounding subsurface formations by projecting the processed waveforms in the selected area(s) or domain(s) to the time domain, using techniques that are known in the art, and plotting the time projected data versus depth of the borehole. The processing may be repeated for each depth of data acquisition, as desirable or necessary.

The time projection techniques described herein provide indication of possible acoustic reflectors in surrounding formations. In some embodiments, reflected arrival waves may be processed in real-time as waveform data are being acquired. In this, real-time indicators of acoustic reflectors enable a wellsite operator to adjust acquisition parameters on the fly thereby improving quality and reliability of the acquired data. Some examples of acquisition parameters that may be adjusted based on the principles discussed herein include duration of data acquisition, delay in data acquisition, transmitter power, transmitter frequency, among others that are known to those having ordinary skill in the art. The indicators of possible acoustic reflectors may also be utilized to fine tune downstream processing of acquired acoustic measurements by focusing the more detailed data processing on the specific data areas having the desired reflected waveform data.

The principles described herein may be applied to various types of data acquisition systems, such as wireline measurements, drilling measurements, production measurements, and so on.

The techniques described above may be used with logging tools and systems of any type. For example, referring again to FIG. 2A, the exemplary sonic tool 230 is shown adjacent to the formation 232 with acoustic reflector 234. The sonic tool 230 includes the source S, and at least one sensor or receiver R. In the exemplary embodiment shown in FIG. 2A, there are multiple receivers. The source/receiver arrangement shown is exemplary in nature and there may be any arrangement of receivers and/or sources.

As one possibility, Schlumberger's wireline sonic imaging tool referred to as the Borehole Acoustic Reflection Survey (BARS) tool may be utilized for the purposes described herein.

The receivers R and source S are coupled to a computer processor (generally designated as 236 in FIG. 2A) for collecting and processing data from the sonic tool 230. Also shown is a wave ray path 238 representing a path for a wave caused by activation of the source S. The receivers R may be of different types, including, but not limited to, piezoelectric and magneto-restrictive receivers. The receivers R are able to detect the arrival of sonic waves; direct arrival waves and reflected arrival waves are depicted in FIG. 2A.

Measurements collected from the sonic tool 230, which may include waveforms generated by the receivers R over time, may be sent to the surface via a cable (not shown) from which the sonic tool is suspended or by any other convenient communication technique (e.g., mud telemetry or wired drillpipe). The computer processor 236 is commercially available from a wide variety of sources. The sonic data taken by the sonic tool 230 and received by the computer processor 236 (in-situ or at the surface) may be processed according to instructions accessible to the computer processor 236 to perform the processing described above. The imaging of acoustic reflectors may be performed at the wellsite, although in other embodiments described herein computations may be done at an off-site processing location using the sonic data collected by the sonic tool.

As mentioned above, according to some aspects of the present disclosure, the methods and systems described herein provide robust, accurate, usable indicators or imaging of acoustic reflectors with a relatively simple process that requires very little computer resources. The methods and systems described herein offer tremendous advantages over prior methods that require significant processing in order to obtain reflected arrivals. The techniques described above enable an operator to see real-time indications of possible reflectors in the surrounding subsurface formations, and to act appropriately during the course of a logging operation. The techniques described above enable a data processing computer center to see indications of possible reflected waveforms in acquired acoustic waveforms, and to appropriately adjust or select data processing parameters during the course of processing acoustic measurements.

The embodiments were chosen and described in order to best explain the principles of the invention and its practical applications. The preceding description is intended to enable others skilled in the art to best utilize the invention in various embodiments and with various modifications as are suited to the particular uses contemplated. It is intended that the scope of the invention be defined by the following claims.

What is claimed is:

1. A method of processing acoustic waveform data relating to a subterranean formation, comprising:
   taking acoustic waveform measurements at one or more depths of a borehole traversing a subterranean formation;
   on a processor extracting a portion of the acoustic measurements based on predetermined parameters for selecting reflected arrival waves in the acoustic measurements, the extracting comprising processing the waveform measurements for a slowness vs. time (ST) plane, generating a processing window around a portion of the processed waveform measurements in the slowness vs. time (ST) plane based on the predetermined parameters, and extracting the processed waveform measurements in the processing window;
   on a processor generating time projection of the extracted acoustic measurements versus borehole depth, the generating comprising projecting the extracted acoustic measurements to arrival time domain of the slowness vs. time (ST) plane; and
   generating an indication or imaging of acoustic reflectors in the formation based on the time projected acoustic measurements.

2. A method of processing acoustic waveform data relating to a subterranean formation according to claim 1, wherein the predetermined parameters for selecting reflected arrival waves are arrival time and formation slowness.

3. A method of processing acoustic waveform data relating to a subterranean formation according to claim 1, wherein the predetermined parameters for selecting reflected arrival waves are:
   maximum arrival time=data acquisition time at a borehole depth;
   minimum arrival time=compressional and/or shear arrival time;
   maximum slowness=estimated or real-time compressional and/or shear slowness for the formation; and
   minimum slowness=0,
   wherein compressional and/or shear arrival time=compressional/shear slowness*TR spacing.

4. A method of processing acoustic waveform data relating to a subterranean formation according to claim 1, wherein:
   the indication or imaging of acoustic reflectors is generated for multiple depths of acoustic measurement.

5. A method of processing acoustic waveform data relating to a subterranean formation according to claim 1, wherein the measurements taken are logging measurements.

6. A method of processing acoustic waveform data relating to a subterranean formation according to claim 1, wherein the measurements taken are while-drilling measurements.

7. A method of processing acoustic waveform data relating to a subterranean formation according to claim 1, wherein the extracting a portion of the acoustic measurements comprises stacking the waveform measurements in the slowness vs. time (ST) plane.

8. A method of taking measurements relating to a subterranean formation according to claim 1, wherein an indication or imaging of acoustic reflectors in the formation is generated in real-time with the acoustic measurements.

9. A method of logging a subterranean formation, comprising:
   generating acoustic waves with a source;
   receiving acoustic waveforms with a plurality of receivers;

on a processor extracting a portion of the acoustic waveforms based on predetermined parameters for selecting reflected arrival waves from the acoustic waveforms, the extracting comprising processing the waveforms for a slowness vs. time (ST plane, generating a processing window around a portion of the processed waveforms in the slowness vs. time (ST) plane based on the predetermined parameters, and extracting the processed waveforms in the processing window;

on a processor generating time projection of the extracted acoustic waveforms versus borehole depth, the generating comprising projecting the extracted acoustic measurements to arrival time domain of the slowness vs. time (ST plane; and providing an indication or imaging of acoustic reflectors in the formation based on the time projected acoustic waveforms for multiple depths of data acquisition, wherein the predetermined parameters for selecting reflected arrival waves are arrival time and formation slowness.

10. A method of logging a subterranean formation according to claim 9, further comprising:

providing at a wellsite, in real-time with receiving acoustic waveforms, the indication or imaging of acoustic reflectors in the formation; and utilizing the indication or imaging of acoustic reflectors for adjusting parameters of the subterranean logging.

11. A method of logging a subterranean formation according to claim 9, further comprising:

utilizing the indication or imaging of acoustic reflectors in the formation for adjusting data processing parameters of the acoustic waveforms.

12. A method of acquiring acoustic measurements relating to a subsurface formation, comprising:

generating acoustic waves with a source;

receiving acoustic waveforms with a plurality of receivers;

in real-time with receiving the acoustic waveforms:

on a processor extracting a portion of the acoustic waveforms based on predetermined parameters for selecting reflected arrival waves from the acoustic waveforms, the extracting comprising processing the waveforms for a slowness vs. time (ST) plane, generating a processing window around a portion of the processed waveforms based on the predetermined parameters, and extracting the processed waveforms in the processing window;

on a processor generating time projection of the extracted acoustic waveforms versus borehole depth, the generating comprising projecting the extracted acoustic measurements to arrival time domain of the slowness vs. time (ST) plane; and generating an indication or imaging of acoustic reflectors in the formation based on the time projected acoustic waveforms for multiple depths of data acquisition; and adjusting parameters relating to the acoustic measurements based on the indication or imaging of acoustic reflectors in the formation.

13. A method of acquiring acoustic measurements relating to a subsurface formation according to claim 12, wherein the adjusting parameters relating to the acoustic measurements comprises:

providing at a wellsite, in real-time with receiving acoustic waveforms, the indication or imaging of acoustic reflectors in the formation; and utilizing the indication or imaging of acoustic reflectors for adjusting data acquisition parameters.

14. A method of acquiring acoustic measurements relating to a subsurface formation according to claim 12, wherein the adjusting parameters relating to the acoustic measurements comprises:

utilizing the indication or imaging of acoustic reflectors in the formation for adjusting data processing parameters of the acoustic measurements.

15. A method of processing acoustic waveform data relating to a subterranean formation, comprising:

taking acoustic waveform measurements at one or more depths of a borehole traversing a subterranean formation;

on a processor extracting a portion of the acoustic measurements based on predetermined parameters for selecting reflected arrival waves in the acoustic measurements, the extracting comprising selecting a portion of the waveform measurements based on the predetermined parameters, processing the selected portion of the waveform measurements for a slowness vs. time (ST) plane, and extracting the processed waveform measurements;

on a processor generating time projection of the extracted acoustic measurements versus borehole depth, the generating comprising projecting the extracted acoustic measurements to arrival time domain of the slowness vs. time (ST) plane; and generating an indication or imaging of acoustic reflectors in the formation based on the time projected acoustic measurements.

* * * * *